United States Patent [19]

Johnston et al.

[11] Patent Number: 4,660,803

[45] Date of Patent: Apr. 28, 1987

[54] QUICK COUPLING CONNECTOR FOR CONNECTING FLEXIBLE LIQUID CONDUITS

[75] Inventors: Damon A. Johnston, Aurora; George L. Garcia, Naperville, both of Ill.

[73] Assignee: Suncast Corporation, Batavia, Ill.

[21] Appl. No.: 833,143

[22] Filed: Feb. 26, 1986

[51] Int. Cl.[4] .............................................. F16L 37/28
[52] U.S. Cl. .......................... 251/149.1; 137/533.17; 285/24; 285/315; 285/323; 285/921
[58] Field of Search .................. 285/24, 27, 315, 319, 285/320, 246, 247, 322, 323, 174, 921; 251/149.1; 137/533.17

[56] References Cited

U.S. PATENT DOCUMENTS

| | | | |
|---|---|---|---|
| 1,699,591 | 1/1929 | Jennings | 285/246 |
| 2,102,774 | 12/1937 | Williams | 251/149.1 |
| 3,468,562 | 9/1969 | Chow et al. | 285/423 |
| 3,847,393 | 11/1974 | Busselmeier | 285/321 |
| 3,873,062 | 3/1975 | Johnston et al. | 285/317 |
| 3,918,679 | 11/1975 | Silvana | 251/149.1 |
| 4,185,655 | 1/1980 | Wilkes et al. | 137/533.17 |
| 4,219,222 | 8/1980 | Brusculin | 285/315 |

Primary Examiner—A. Michael Chambers
Attorney, Agent, or Firm—Fitch, Even, Tabin & Flannery

[57] ABSTRACT

The present invention is a quick coupling connector for use in connecting and disconnecting hoses adapted for conducting liquids. The connector includes a unitary molded plastic male connector body having a flow through passage extending therethrough. The body includes a guide cylinder, a lock recess adjacent to the guide cylinder, and a seating cylinder adjacent to the lock recess. The seating cylinder has an annular seal groove. An inner body O-ring is positioned in the seal groove. A unitary molded plastic female connector body having a flow through passage selectively mateably receives the male connector body. The female connector body includes a guide tube receiving the guide cylinder, a lock tube having a lock finger aperture, and a seating cylinder connected to the guide cylinder and sealingly engageable with the inner body O-ring. A mounting tube is connected to the seating tube. A tubular hose nose is mounted in the mounting tube. A locking sleeve is mounted on the mounting tube for holding a hose mounted on the hose nose. A unitary molded plastic lock ring is movably mounted on the female body having a portion engageable with the male connector body. A valve is mounted in the female connector body to control the flow of liquid through the female connector body. The valve is engageable with the male connector body to be displaced from its closed attitude to allow a liquid to flow through the female connector body.

14 Claims, 8 Drawing Figures

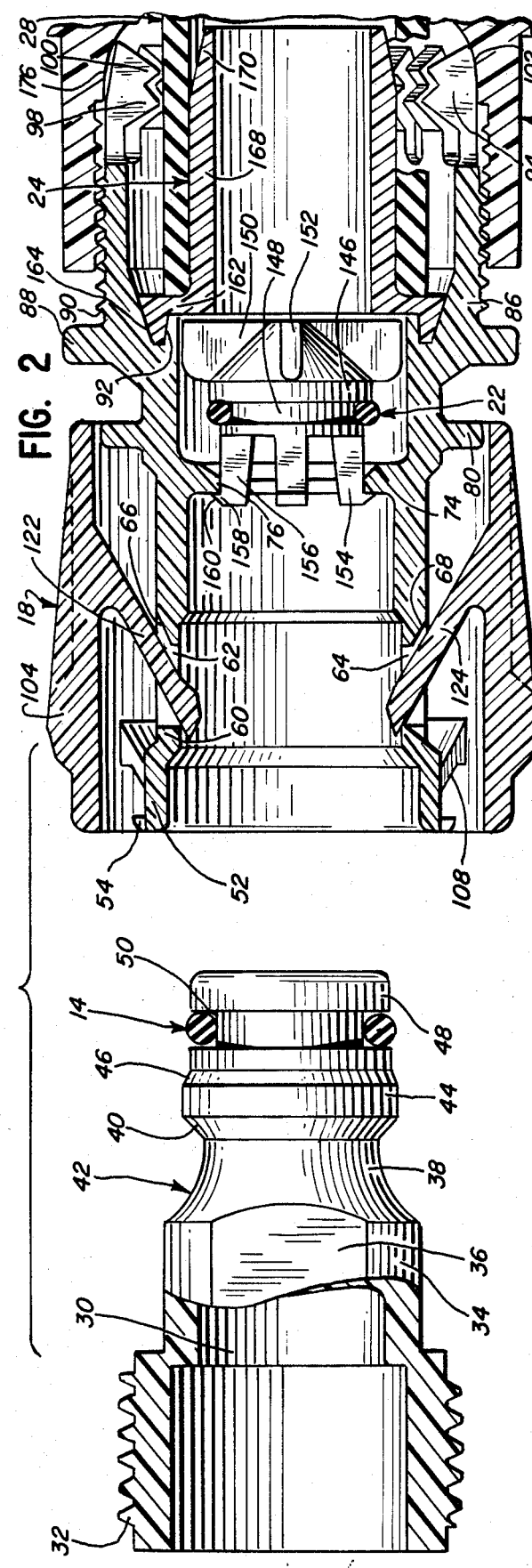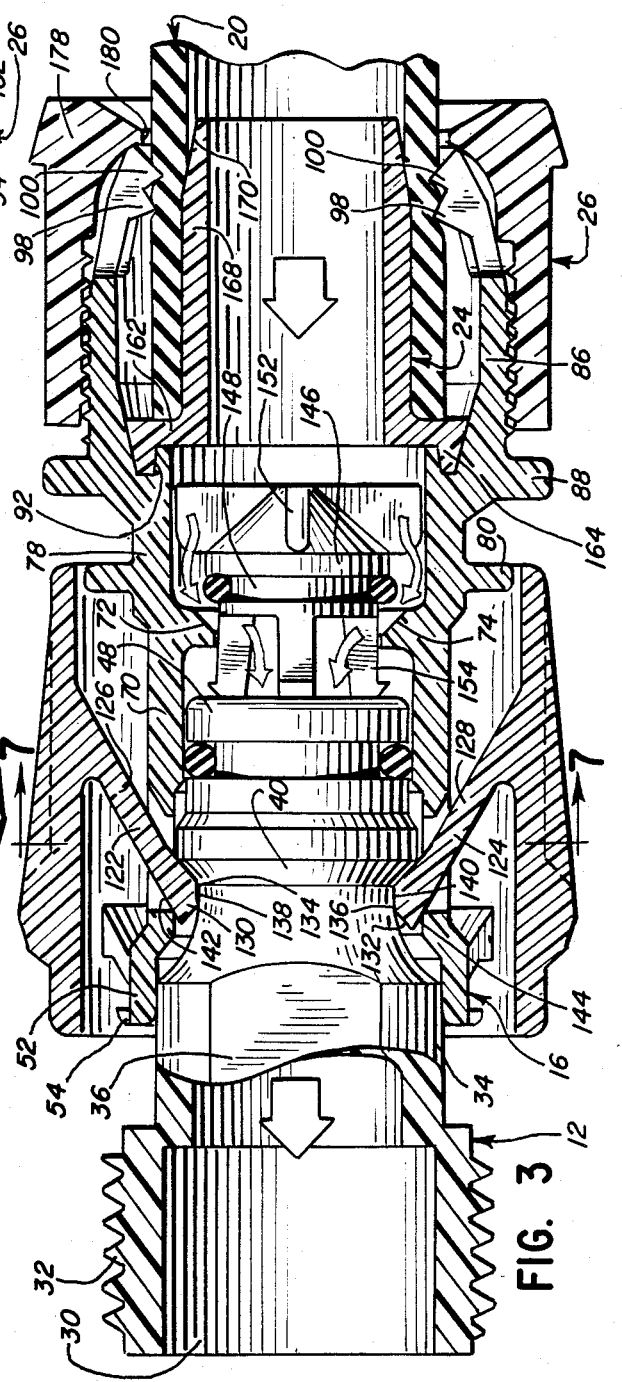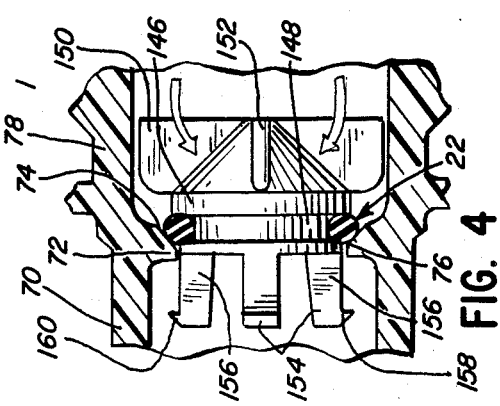

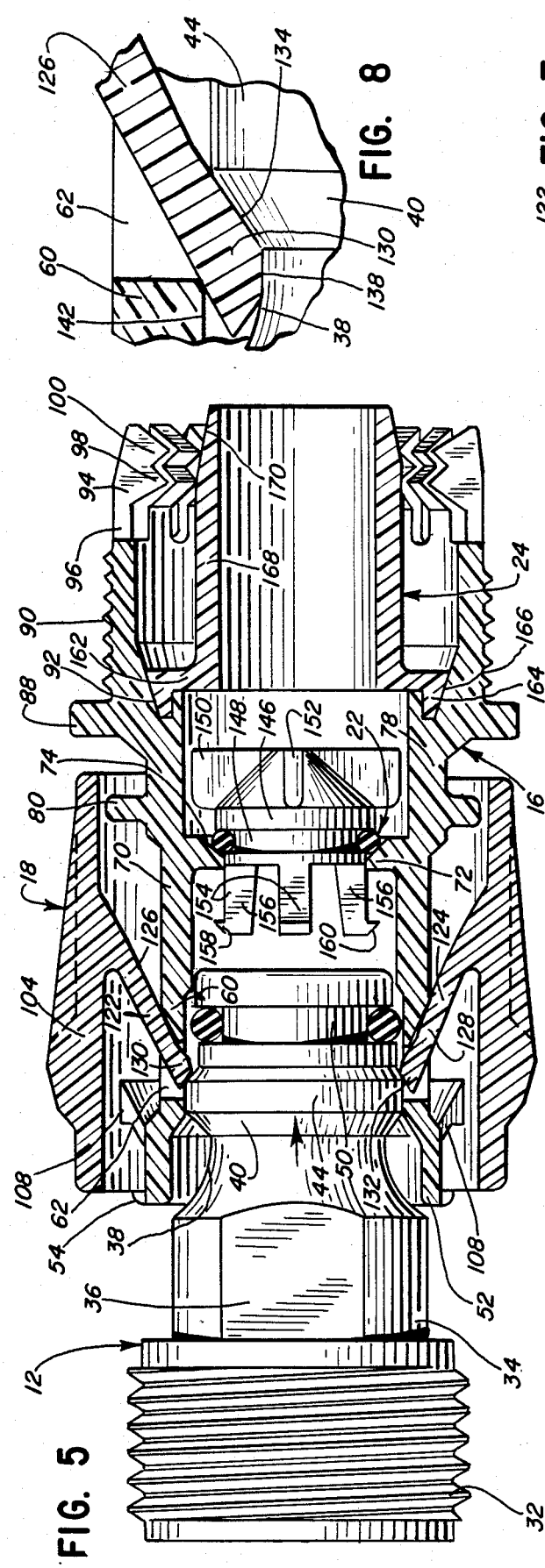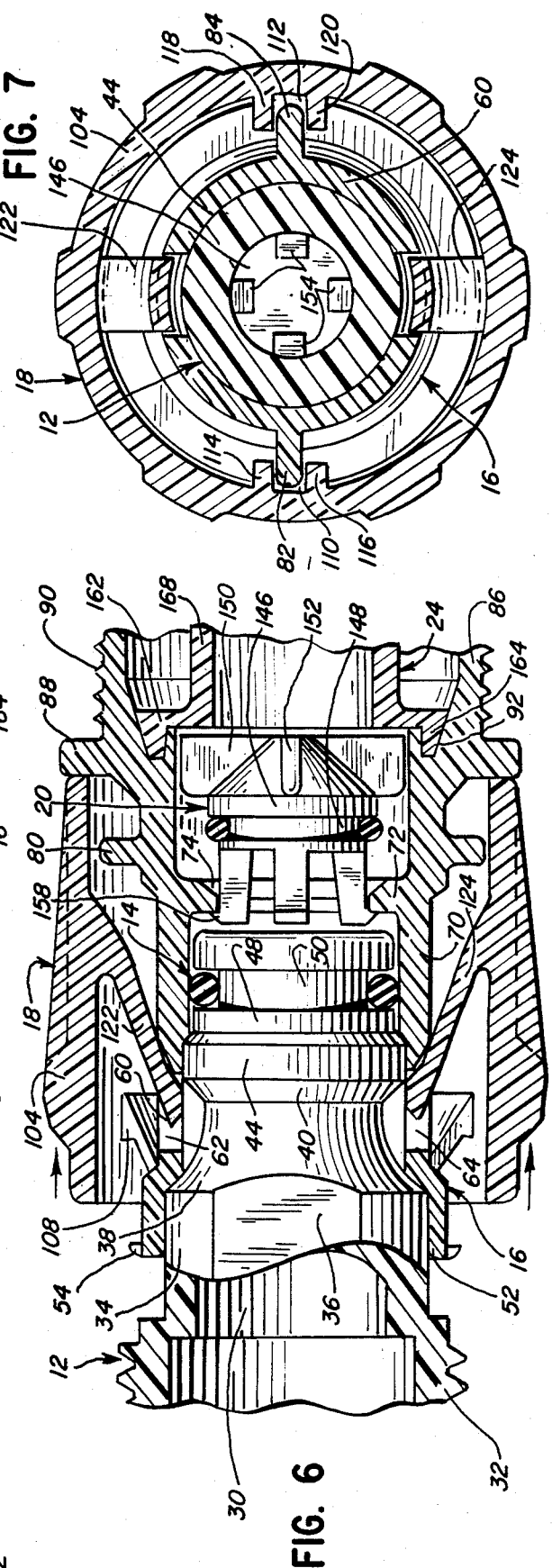

QUICK COUPLING CONNECTOR FOR CONNECTING FLEXIBLE LIQUID CONDUITS

BACKGROUND OF THE INVENTION

The present invention relates to an improved quick coupling connector for use in connecting and disconnecting hoses adapted for conducting liquids and in particular garden hoses. Typcially, garden hose connectors are relatively expensive since the connectors must be made of materials which will not corrode when the connectors are left out of doors and periodically wetted by water. The connector must be durable and must withstand a substantial degree of abuse such as being dragged on a concrete or black top driveway. Furthermore, it is desirable to provide a connector which quickly and easily disconnects one hose from another hose and also closes the connector so that a flow of water from the garden hose is interrupted, thereby allowing another hose to be added or removed and the hose may be connected to a working device, such as, a sprinkler or a spray nozzle. It is further desirable to provide a connector construction which allows the connector to be quickly and easily mounted on one end of a hose.

It has been found that it is particularly desirable to have a connector in which the parts are made of plastic so that the parts will not rust and may have complex shapes at a relatively low cost.

The utilization of a plastic connector which is attached to a hose quickly and conveniently is shown in U.S. Pat. No. 4,219,222, issued Aug. 26, 1980, to G. Brusadin, and entitled, "Rapid Coupling And Uncoupling Joint For Flexible Pipes".

The quick connection of a hose to a connector has been the subject of a number of patents which patents are as follows: U.S. Pat. No. 1,234,812, issued July 31, 1917, to J. F. Simmons, entitled "Hose Coupling"; U.S. Pat. No. 1,684,713, issued Sept. 18, 1928, to C. A. Norgren, entitled, "Hose Clamp"; U.S. Pat. No. 3,606,396, issued Sept. 20, 1971, to G. Prosdocimo, entitled, "Universal Pipe Gripping Union"; U.S. Pat. No. 3,659,881, issued May 2, 1972, to Tinsley et al., entitled, "Coupling Connector"; U.S. Pat. No. 4,257,629, issued Mar. 24, 1981, to Maple et al., entitled, "Flexible Conduit Repair Coupling"; British Pat. No. 1,479,499, published July 13, 1977, to F. J. Progar et al., entitled, "Improvements In Or Relating To Pipe Fittings"; British Pat. No. 1,494,323, published Dec. 7, 1977, to E. Lotigie, entitled, "Coupling Element For Pipe Ends"; and French Pat. No. 2,522,388.

The broad concept of having a coupling for hoses which coupling contains a shut off valve when the coupling is disengaged is shown in the following patents: U.S. Pat. No. 2,327,611, issued Aug. 24, 1943, to A. T. Scheiwer, entitled, "Coupling"; U.S. Pat. No. 2,789,838, issued Apr. 23, 1957, to G. H. Palm, entitled, "Pipe In Socket Type Hose Coupler With Check Valve"; U.S. Pat. No. 2,823,934, issued Feb. 18, 1958, to D. W. Gorrell et al., entitled, "Coupling With Cam Washer For Flat Detents"; U.S. Pat. No. 3,601,361, issued Aug. 24, 1971, to E. Hundhausen et al., entitled, "Plug-In Coupling For Garden And Other Hoses"; U.S. Pat. No. 3,918,679, issued Nov. 11, 1975, to Silvana, entitled, "Universal Coupling"; U.S. Pat. No. 4,148,459, issued Apr. 10, 1979, to Martinez, entitled, "Quick Disconnect Valved Coupling"; U.S. Pat. No. 4,429,906, issued Feb. 7, 1984, to Spadotto et al., entitled, "Female Element For Quick-Coupling Connection For Flexible Pipes".

The construction of a quick connect connector for a hose with a valve in the connection is taught in U.S. Pat. No. 4,063,708, issued Dec. 20, 1977, to Smith, entitled, "Quick Disconnect Device For Flexible Tubes".

What is needed is a quick operating connector which is made of a plurality of molded unitary pieces eliminating the need for any metal parts in the connector, which parts may be easily assembled and provide a smooth operating connector which automatically shuts off the flow of water when portions of the connector are disengaged.

SUMMARY OF THE INVENTION

The instant invention relates to an all plastic quick coupling connector for connecting and disconnecting flexible hoses adapted to conducting liquids. The connector includes a unitary molded plastic male connector body having a flow through passage through the center of the body along the longitudinal axis of the body. A guide cylinder is formed adjacent to one end of the body, and a lock recess is formed adjacent to the guide cylinder. A seating cylinder is formed on one end of the body. The seating cylinder has an annular seal groove formed therein. An inner body O-ring is mounted in the seal groove.

A unitary molded plastic female connector body having a flow through passage in its center and along its longitudinal axis mateably receives a portion of the male connector body. The female connector body includes a guide tube on one end for mateably receiving the guide cylinder. A lock tube is connected to the guide tube. The lock tube has a lock finger aperture extending therethrough. A seating tube is formed integral with the lock tube for receiving the seating cylinder for selectively sealing engagement with the inner body O-ring. A mounting tube is connected to the seating tube. The mounting tube includes a plurality of resilient holding fingers. Each of the holding fingers has a resilient support with a catch formed integral with each support extending interiorly of the mounting tube. A tubular hose nose is sealingly mounted in the interior of the mounting tube adjacent to the holding fingers for receiving an end of a garden hose.

A unitary molded plastic locking sleeve is releasably mounted on the mounting tube. The locking sleeve includes an annular cam for engagement with the holding fingers to force each catch into engagement with the hose mounted on the hose nose. A unitary molded plastic lock ring is movably mounted on the female connector body. The lock ring includes a resilient lock finger extending into the lock finger aperture and being releasably engageable with the male connector body for holding the male connector body in mating engagement with the female connector body.

A valve is mounted in the female connector body. The valve regulates the flow of liquid through the female connector body. The valve includes a plurality of legs which are engageable with the male connector body. Positioning of the male connector body within the female connector body into engagement with the legs displaces the valve from a closed sealing attitude to allow liquid to flow through the female connector body.

BRIEF DESCRIPTION OF THE DRAWINGS

FIG. 2 is a cross sectional view of a portion of the connector with a male connector body positioned adjacent to a female connector body and showing a valve mounted in the female connector body in an open attitude;

FIG. 3 is a partial cross sectional view of the connector shown in FIG. 2 but showing the male connector body positioned in the female connector body and in a locked attitude also showing the valve displaced to allow liquid to flow through the female connector body;

FIG. 4 is a partial cross sectional view of a portion of the connector showing a valve in a portion of the female connector body in a closed attitude;

FIG. 5 is a partial cross sectional view of the connector showing the valve in a closed attitude and the male connector body being partially inserted into the female connector body;

FIG. 6 is a partial cross sectional view of the connector showing a lock ring in a fully retracted position to allow the male connector body to be withdrawn from the female connector body and the valve shown in an open attitude;

FIG. 7 is a cross sectional view taken on Line 7—7 of FIG. 3; and

FIG. 8 is an enlarged fragmentary cross sectional view of a portion of the connector showing a locking finger in engagement with a portion of the male connector body and a portion of the female connector body to lock the male connector body in the female connector body.

DESCRIPTION OF THE PREFERRED EMBODIMENT

Figure 1:
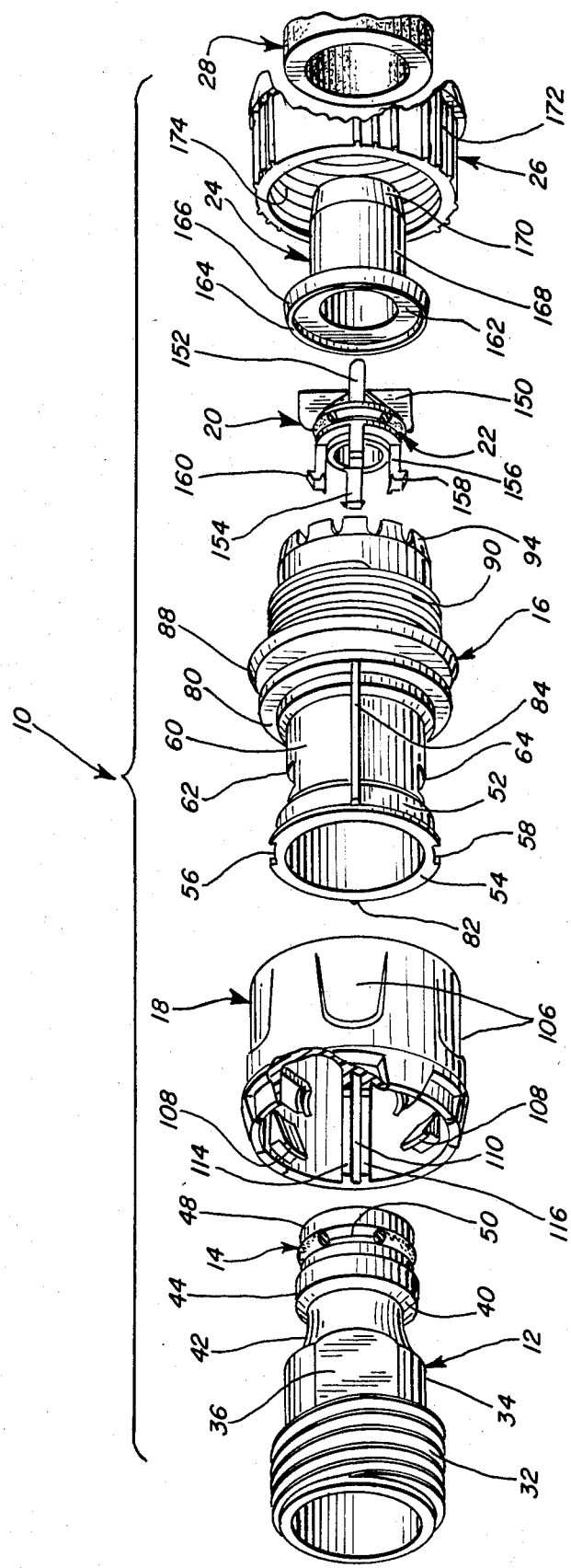
FIG. 1 is a perspective exploded view of a connector embodying the herein disclosed invention with portions of certain parts of the connector broken away to show better the construction of each of the parts.

Referring now to the drawings, and especially to FIG. 1, a quick coupling connector embodying the herein disclosed invention is shown therein and is generally indicated by the numeral 10. Quick coupling connector 10 generally includes a unitary molded plastic male connector body 12 with a conventional inner body O-ring 14 mounted on the body. A unitary molded plastic female connector body 16 is particularly adapted for mateably receiving the male connector body. A unitary molded plastic lock ring 18 is adapted for mounting on the exterior of the female connector body for releasably locking the male connector body in engagement with the female connector body. A unitary molded plastic valve 20 is movably mounted in the female connector body for controlling the flow of liquid through the female connector body. A conventional valve O-ring 22 is mounted on valve 20 for sealing engagement with the female connector body. A unitary molded plastic tubular hose nose 24 is adapted for being sealingly mounted in the female connector body. A unitary molded plastic locking sleeve 26 is threadedly mountable on the female connector body for holding one end of a conventional and well known garden hose 28 connected to the hose nose.

Refering now to FIGS. 2 and 3, the male connector body is shown therein. The male connector body is molded of acrylonitrile-butadiene-styrene copolymer. The body has a flow through passage 30 extending through the length of the body along the longitudinal axis of the body to allow water to flow through the length of the body. The body has a conventional garden hose type male threaded connector 32 on one end with a guide cylinder 34 having one end formed integral with connector 32. Guide cylinder 34 has a pair of identical parallel flat walls 36 formed in opposite sides. A curve conical surface 38 is formed integral with the other end of the guide cylinder. Conical surface 38 is formed integral with a conical lock surface 40 to define a lock recess 42. A guide ring 44 is formed integral with the conical lock surface. The guide ring includes a taper surface 46 which is formed integral with a seating cylinder 48. An annular seal groove 50 is formed in the seating surface and receives the conventional inner body O-ring.

Female connector body 16 is also a unitary injection molded polypropylene part having a flow through passage through its length along its longitudinal axis. The female connector body includes a guide tube 52 having a lock flange 54 formed integral with one end of the guide tube. The lock flange includes a pair of finger recesses 56 and 58. A lock tube 60 has one end formed integral with the other end of the guide tube. The lock tube includes a pair of diametrically opposed finger lock apertures 62 and 64 which are aligned with finger recesses 56 and 58. Finger camming surfaces 66 and 68 are formed in the lock tube and communicate with and are aligned with lock finger apertures 62 and 64, respectively. The finger camming surfaces 66 and 68 are also aligned with finger recesses 56 and 58. A seating tube 70 is formed integral with the other end of the lock tube. A valve wall 72 is formed integral with the interior of the seating tube. The valve wall includes a valve seat 74 which defines a valve aperture 76 which extends through the valve wall to allow liquid to flow through the valve wall.

A valve tube 78 has one end formed integral with the seating tube. The valve tube includes a guide flange 80 formed integral with the exterior surface of the guide tube. A pair of opposed guide wings 82 and 84 is formed integral with the guide tube, lock tube, and seating tube and extend radially outward from those tubes. Each of the guide wings is parallel to the other guide wing and the wings are parallel to the longitudinal axis of the female connector body. The guide wings extend from the lock flange to the guide flange. They are each spaced approximately 90° from the lock finger apertures.

A mounting tube 86 is formed integral with the other end of the valve tube. A limit flange 88 is formed integral with the exterior surface of the mounting tube and extends radially outwardly therefrom. A male thread 90 is formed on the exterior surface of the mounting tube to the limit flange. A nose recess 92 is formed in the interior of the mounting tube to receive tubular hose nose 24. A plurality of identical holding fingers 94 forms the end of the mounting tube. Each of the holding fingers includes a resilient cantilever support 96 with a pair of catches 98 and 100 on the free end of the support. Catch 100 is at the furthest outward end. Each of the holding fingers has an exterior camming edge 102.

Lock ring 18 is also an injection molded unitary thermoplastic polyester-polycarbonate alloy part. The lock ring includes an annular lock ring body 104. The lock ring body has a plurality of finger indentations 106 on its outer surface to facilitate grasping and operating the lock ring. Four identical flexible internal cantilever ears 108 are formed integral with the interior of the body for engagement with the lock flange of the female connector body to hold the lock ring on the female connector body. The internal ears are radially equidistantly spaced apart. The lock ring includes opposed guide grooves 110 and 112 which receive guide wings 82 and 84, respectively. Guide groove 110 is formed by walls 114 and 116 which are parallel to the longitudinal axis of the lock ring body. Guide groove 112 is formed by the longitudinal walls 118 and 120 which are opposed to walls 114 and 116, respectively. Walls 118 and 120 are also parallel to the longitudinal axis of the lock ring body. The grooves 110 and 112 in cooperation with guide wings 82 and 84, respectively, limit the motion of the lock ring to a longitudinal motion of the lock ring relative to the female connector body.

A pair of diametrically opposed lock fingers 122 and 124 is formed integral with the interior of the lock ring body. Lock fingers 122 and 124 have resilient arms 126 and 128, respectively. Each of the arms 126 and 128 has one end formed integral with the interior of the lock ring body. As may be seen in FIG. 2, the lock fingers extend generally along the longitudinal axis of the lock ring body away from the mounting tube and slope inward at an angle of approximately thirty degrees. Lock dogs 130 and 132 are formed on the free ends of resilient arms 126 and 128, respectively. Lock dogs 130 and 132 include engaging surfaces 134 and 136, respectively, for engagement with conical lock surface 40 of the male connector body. Lock dogs 130 and 132 also include rest surfaces 138 and 140, respectively, and stop surfaces 142 and 144, respectively. The rest surfaces are adapted for engagement with the male connector body in the lock recess 42 while the stop surfaces are adapted for engagement with the lock tube of the female connector body.

Valve 20 is an injection molded unitary acrylonitrile-butadiene-styrene copolymer part which includes a valve body 146 having annular valve O-ring groove 148 formed therein. The valve O-ring 22 is mounted in annular valve O-ring groove 148. A pair of crossed fins 150 and 152 is formed integral with the valve body. The valve includes four identical legs 154 formed integral with the valve body on the side of the body adjacent to the male connector body and on the side opposite to fins 150 and 152. Each leg 154 includes a resilient cantilever post 156 with a valve catch 158 formed integral with the free end of the post. A valve camming surface 160 is formed integral with the outer surface of the valve catch for engagement with the valve seat for insertion of the valve into the valve aperture.

Tubular hose nose 24 is also an injection molded unitary polypropylene part. The hose nose includes an annular body 162 with a nose mounting ring 164 formed integral with the nose annular body. A conical mounting surface 166 is formed on the nose mounting ring and is mateable with the interior of nose recess 92 of the female connector body mounting tube. A hose tube 168 has one end formed integral with the nose annular body and a tapered engaging surface 170 formed on the free end of the tube to faciliate insertion of the tube into garden hose 28.

Locking sleeve 26 is an injection molded unitary acrylonitrile-butadiene-styrene copolymer part. The locking sleeve includes a cylindrical sleeve body 172 with a female thread 174 formed internally therein for threadedly mating with the male thread of the mounting tube. An internal annular cam 176 is formed within the cylindrical sleeve body for engagement with the holding fingers of the mounting tube. A sleeve ring 178 is formed internally of the cylindrical sleeve body with a ridge 180 formed on the end of the ring.

The various pieces of the connector are assembled as follows. Valve O-ring 22 is placed into valve O-ring groove 148 of valve 20. This is done in a conventional fashion. With the O-ring in place, the valve is then inserted into the female connector body. The valve is placed into mounting tube 86 with legs 156 facing valve wall 72. The valve is moved toward the valve wall until the legs engage valve seat 74. Valve camming surface 160 of each of the legs engages the valve seat. A force is applied to the valve body to push the valve body toward the valve wall. The resilience of posts 156 allows the posts to deform sufficiently so that valve catch 158 on each of legs passes through valve aperture 76. Once the catches are through the valve aperture, the resilience of the respective posts urges the catches outward to position the catches on the side of valve wall 72 within seating tube 70 as may be seen in FIG. 2. The valve is held within the valve aperture so that when valve body 146 is moved into the valve aperture, valve O-ring 22 seats on valve seat 74 to seal closed valve aperture 76.

Tubular hose nose 24 is positioned in mounting tube 86. Nose mounting ring 164 is positioned in nose recess 92 with conical mounting surface 166 in engagement with the mounting tube. The nose mounting ring is sealingly fixed to the mounting tube by the application of ultrasonic welding so that the parts are welded together. Nose annular body 162 also forms a limitation on the amount of movement which the valve may make.

Lock ring 18 is mounted on female connector body 16. The lock ring is positioned with lock fingers 122 and 124 aligned with finger recesses 56 and 58, respectively, of lock flange 54 and guide wings 82 and 84 positioned in grooves 110 and 112, respectively. The lock ring is moved axially parallel to the longitudinal axis of the female connector body. The resilience of the lock fingers allows the lock fingers to pass through the finger recesses. As the lock ring is moved toward mounting tube 86, internal ears 108 engage lock flange 54. The internal ears are formed integral with the interior lock ring body with the free ends of the ears extending outward. The ears 108 are deflected and pass over the lock flange. Inasmuch as the lock fingers are positioned in the finger recesses, the lock fingers are aligned with the respective lock finger apertures. Lock finger 122 has its lock dog 130 drop into lock finger aperture 60, and lock dog 132 of lock finger 124 drops into lock finger aperture 62. The wings 82 and 84 are positioned in guide grooves 110 and 112, respectively, to keep the lock fingers aligned with the lock finger apertures. The lock ring body has its interior in engagement with guide flange 80 while ears 110 engage guide tube 52. Thus, the lock ring is centered on and maintained in a parallel attitude with the female connector body. Limit flange 88 provides a stop for the lock ring. The extension of ears 108 away from the lock fingers causes the ears to engage lock flange 54 and prevents the lock ring from being removed from the female connector body. Furthermore, the positioning of the lock fingers in the respective finger apertures also limits axial movement of the lock ring. The guide wings positioned in the guide grooves prevent the lock ring from rotating about the female connector body.

Garden hose 28 is connected to the female connector body. Locking sleeve 26 is first placed on the end of garden hose 28. The end of the garden hose is then placed inside mounting tube 86 and slipped over tapered engaging surface 170 of hose tube 168. The hose is moved toward hose annular body 162 until the end of the hose engages the body. Locking sleeve 26 is then moved along the garden hose until the locking sleeve has its female thread 174 engage male thread 90 of mounting tube 86. As is conventional, the locking sleeve is rotated to draw the locking sleeve toward limit flange 88. As the locking sleeve moves axially along the mounting tube, internal annular cam 176 engages camming edges 102 of holding fingers 94. Further movement of the locking sleeve toward the limit flange causes catches 98 and 100 of the holding fingers to be urged inward toward each other and thereby engage the garden hose. The catches displace a portion of the wall of the garden hose and thereby firmly engage the garden hose. It may be appreciated that the garden hose is held between hose tube 168 on its interior and the catches 98 and 100 on its exterior. Thus, the garden hose may not be withdrawn from the mounting tube.

The male connector body has inner body O-ring 14 mounted in seal groove 50 as is conventional. The male connector body may be connected to any conventional garden appliance, such as, a hose or a nozzle, which is mounted on the conventional hose male threaded connector 32.

When the garden hose 28 is connected to a source of water, the water flows into the garden hose and then through the hose tube. The flow of the water engages fins 150 and 152 and valve body 156 and moves the valve body toward seating tube 70. The valve O-ring then seats on valve seat 74 thereby sealing closed valve aperture 76. It may be appreciated that the greater the pressure, the harder the valve O-ring is seated against the valve seat, thereby improving the closure. In view of the fact that there are four legs on the valve body, the legs are in engagement with the valve aperture so that there is little opportunity for the valve to tilt when the valve O-ring is moved toward the valve seat. Thus, the valve is always aligned to achieve the sealing attitude which is shown in FIG. 4.

When the male connector body 12 is inserted into the female connector body, the valve is displaced and water flows through the valve aperture and into the flow passage 30 in the male connector body. The male connector body is moved toward the female connector body so that the seating cylinder 48 first enters guide tube 52. Further movement of the male connector body causes seating cylinder 48 to displace lock fingers 122 and 124. The seating cylinder enters seating tube 70, and the lock fingers then ride over guide ring 44 and into engagement with the conical lock surface 40. Simultaneously, the end of the seating cylinder engages the ends of legs 156 to displace the valve O-ring from valve seat 76 to the attitude shown in FIG. 3. If the male connector tube is moved slightly outward, lock dogs 130 and 132 lock the male connector tube in the female connector tube. Engaging surfaces 134 and 136 rest on the conical lock surface and stop surfaces 142 and 146 engage the interior of lock tube 60. Thus, the male connector body may not be withdrawn from the female connector body, and the lock dogs lock the male connector body within the female connector body.

When it is desired to remove the male connector body from the female connector body, the lock ring is retracted to release the male connector body. In order to retract the lock ring, the operator grasps the exterior of the lock ring body which has finger indentations 106 to provide a convenient means for holding the body. The lock ring is moved toward limit flange 88. Lock fingers 122 and 124 extend away from the limit flange so that when the lock ring is pulled toward the limit flange, resilient arms 126 and 128 are placed into tension, and the lock dogs engage the conical lock surface to move the male connector body inward into the female connector body to allow the stop surface to disengage the interior of the lock ring. The continued movement of the lock ring toward the limit flange causes the lock fingers to engage the finger camming surfaces 66 and 68. Further movement of the lock ring causes the lock dogs 130 and 132 to be pushed into the lock finger apertures 62 and 64, respectively. Thus, the male connector body may be smoothly and conveniently moved out of the female connector body. As the male connector body is moved out of engagement with the female connector body, the flow of water moves valve 20 into the closed attitude, such as that shown in FIG. 4. Thus, disengagement of the male connector body also shuts off the flow of water through the connector. The operator is able to shift the connection from one utensil to the other, such as, from a sprinkler to a pistol nozzle, without turning off the water at the source and turning it back on.

From the foregoing explanation, it may be seen how all of the parts of the instant connector are made of a non-corrosive material. The parts are arranged so that the parts are activated either by the water flowing through the connector or by the operator who controls selectively the engagement and disengagement of the connector. There is a clear flow through the connector when the male connector body is locked to the female connector body. The water flows from the hose into hose tube 168 and then into valve tube 78. The water flows through valve aperture 76 into seating tube 70. Inner body O-ring 14 seals the space between seating cylinder 48 and seating tube 70 so that the water then enters seating cylinder 48. The water then flows through passage 30 into a device mounted on male thread connector 32. As was explained above, as soon as the male connector body is partially removed from the female connector body, the flow of water forces valve 20 to close valve aperture 76, and thereby interrupt the free flow of water.

Although a specific embodiment of the herein disclosed invention has been shown in the accompanying drawings and described in detail above, it is readily apparent that those skilled in the art may make various modifications and changes without departing from the spirit and scope of the present invention. It is to be expressly understood that the instant invention is limited only by the appended claims.

We claim:

1. A quick coupling connector for use in connecting and disconnecting hoses adapted for conducting liquids comprising: a unitary molded plastic male connector body having a flow through passage through its length, said male connector body having a guide cylinder forming a portion of the body and a lock recess adjacent to the guide cylinder, and a seating cylinder adjacent to one end of the body with a seal groove formed in the seating cylinder; an inner body O-ring positioned in the seal groove; a unitary molded plastic female connector body having a flow through passage extending through its length, said female body having a guide tube on one end for mateably receiving the guide cylinder of the male connector body, a lock tube connected to the guide tube, said lock tube having a pair of opposed lock finger apertures, and a seating tube formed integral with the lock tube for receiving the seating cylinder of the male connector body and for selective sealing engagement with the inner body O-ring; and a lock ring movably mounted on the female connector body and having a portion releasably engageable with the male connector body for releasably locking the male connector body in engagement with the female connector body, said lock ring being a unitary molded plastic part including a pair of integral lock fingers, each of the lock fingers including a resilient arm having one end extending toward the male connector body when said male connector body is positioned adjacent to the guide tube, and each of the resilient arms having a lock dog formed integral with the free end of the respective resilient arm, each lock dog being positionable in the lock finger aperture of the female connector body for engagement with the male connector body to prevent removal of the male connector body from the female connector body, wherein said female body has a valve seat adjacent to the seating tube, said valve seat defining a valve aperture; a valve movably mounted in the valve aperture, said valve having a valve body, an annular valve O-ring groove formed in the valve body, and a plurality of legs formed integral with the valve body and being positioned in the valve aperture, said legs being engageable with the male connector body to displace the valve in the valve aperture; and a valve O-ring in the valve O-ring groove for selective sealing engagement with the valve seat.

2. A quick coupling connector for use in connecting and disconnecting hoses adapted for conducting liquids comprising; a unitary molded plastic male connector body having a flow through passage extending through the length of the body, said male connector body having a guide cylinder forming a portion of the body, a lock recess adjacent to the guide cylinder, a seating cylinder adjacent to one end of the body, and said seating cylinder having an annular seal groove formed therein; an inner body O-ring positioned in the seal groove; a unitary molded plastic female connector body having a flow through passage extending through the length of the female connector body, said female connector body having a guide tube on one end for mateably receiving the guide cylinder of the male connector body, a lock tube connected to the guide tube, said lock tube having a pair of lock finger apertures, a seating tube formed integral with the lock tube for mateably receiving the seating cylinder of the male connector body and for selective sealing engagement with the inner body O-ring, a valve seat adjacent to the seating tube, and said valve seat defining a valve aperture; a unitary molded plastic lock ring movably mounted on the female connector body and having a portion releasably engageable with the male connector body for releasably locking the male connector body in the female connector body; and a unitary molded plastic valve movably mounted in the valve aperture, said valve having a valve body, a valve O-ring groove formed in the valve body, a fin formed integral with the valve body and being positioned on the side of the valve body away from the valve seat, and a plurality of legs formed integral with the valve body and being positioned in the valve aperture, said legs being engageable with the male connector body to displace the valve body from the valve seat; and a valve O-ring mounted in the valve O-ring groove for sealing engagement with the valve seat.

3. A quick coupling connector for use in connecting and disconnecting hoses adapted for conducting liquids, as defined in claim 2, wherein said female connector body includes a mounting tube connected to the seating tube, said mounting tube having a nose recess, said mounting tube including a plurality of resilient holding fingers extending away from the guide tube, each of said holding fingers including a resilient support, a catch formed integral with each support extending interiorly of the mounting tube, and each of said fingers having a camming edge; a hose nose sealingly mounted in the nose recess and extending through the interior of the mounting tube with a portion adjacent to the holding fingers for receiving an end of a garden hose; and a locking sleeve mounted on the mounting tube, said locking sleeve having an internal annular cam engageable with the camming edge of each of the holding fingers to force each catch into engagement with a hose mounted on the hose nose for holding the hose on the hose nose.

4. A quick coupling connector for use in connecting and disconnecting hoses adapted for conducting liquids, as defined in claim 2; wherein said female connector body includes a lock flange formed integral with the guide tube, said lock flange having a pair of finger recesses, a guide flange connected to the seating tube, a pair of guide wings extending radially from the female connector body aligned with the axis of the female connector body and extending between the lock flange and the guide flange, and a limit flange connected to the guide flange; said lock ring having an annular lock ring body, said lock ring body having a plurality of finger indentations on its outer surface, a plurality of internal ears engageable with the guide tube for stabilizing the lock ring on the female connector body, a pair of internal quide grooves slideably receiving the guide wing, and a pair of locking fingers mounted on the interior of the lock ring body positionable in the lock finger apertures of the female connector body, each of said lock fingers including a cantilever resilient arm having one end formed integral with the interior of the lock ring body, each of said arms extending from the point of connection to the lock ring body to its free end toward the lock flange, a lock dog formed integral with the free end of each of the resilient arms, each lock dog having an engaging surface engageable with the male connector body, each lock dog having a rest surface positionable in the lock recess, and each lock dog having a stop surface engageable with the lock tube of the female connector body.

5. A quick coupling connector for use in connecting and disconnecting hoses adapted for conducting liquids comprising; a unitary molded plastic male connector body having a flow through passage extending through its length, said male connector body having a male threaded connector on one end, a guide cylinder connected to the threaded connector, a lock recess adjacent to the guide cylinder, a conical lock surface connected to the guide cylinder, a guide ring adjacent to the conical lock surface, a seating cylinder connected to the guide ring, and said seating cylinder having an annular seal groove formed therein; an inner body O-ring positioned in the seal groove; a unitary molded plastic female connector body having a flow through passage extending through its length, said female connector body having a guide tube on one end for mateably receiving the guide cylinder, a lock flange formed integral with the guide tube, said lock flange having a pair of finger recesses, a lock tube formed integral with the guide tube, said lock tube having a pair of lock finger apertures, each of said finger apertures being aligned with the finger recesses of the lock flange, a seating tube formed integral with the lock tube for selectively receiving of the seating cylinder of the male connector body and for selective sealing engagement with the inner body O-ring, a guide flange connected to the seating tube, a pair of guide wings on the connector body extending radially therefrom aligned with the longitudinal axis of the female connector body and extending between the lock flange and the guide flange, and a limit flange connected to the guide flange; a unitary molded plastic lock ring movably mounted on the female connector body, said lock ring having an annular lock ring body, said lock ring body having a plurality of finger indentations on its outer surface, a plurality of internal ears formed integral with the interior of the lock ring body engageable with the guide tube for stabilizing the lock ring on the female connector body, a pair of internal guide grooves slideably receiving the guide wings, and a pair of lock fingers mounted on the interior of the lock ring body positionable in the lock finger apertures of the female connector body, each of said lock fingers including a cantilever resilient arm having one end formed integral with the interior of the lock ring body, each of said arms extending from the point of connection to the lock ring body to its free end toward the lock flange, a lock dog formed integral with the free end of each of the resilient arms, each lock dog having an engaging surface engageable with the conical lock surface, each lock dog having a rest surface positionable in the lock recess, and each lock dog having a stop surface engageable with the lock tube of the female connector body, whereby the lock ring is limited to motion axially of the connector body between the lock flange and the limit flange and movement of the lock ring toward the limit flange cams the lock fingers outward for disengagement from the male connector body.

6. A quick coupling connector for use in connecting and disconnecting hoses adapted for conducting liquids, as defined in claim 5; wherein said female connector body has a valve wall formed integral with the seating tube, said valve wall having a valve seat defining a valve aperture; a unitary molded plastic valve movably mounted in the valve aperture for controlling flow of a liquid through the valve aperture, said valve having a valve body, a valve O-ring groove formed in the valve body, a fin formed integral with the side of the valve body positioned away from the guide tube, and a plurality of legs formed integral with the side of the valve body adjacent to the guide tube, said plurality of legs being positioned in the valve aperture and being engageable with the male connector body for displacement of the valve body from the valve aperture to allow liquid to flow through the valve aperture; and a valve O-ring mounted in the valve O-ring groove for selective sealing engagement with the valve seat.

7. A quick coupling connector for use in connecting and disconnecting hoses adapted for conducting liquids, as defined in claim 5; wherein said female connector body includes a mounting tube connected to the seating tube, said mounting tube having a nose recess in its interior, said mounting tube including a plurality of integral resilient holding fingers extending away from the guide tube, each of said holder fingers having a resilient cantilever support, a catch formed integral with the free end of each support, each catch extending interiorly of the mounting tube, each of said fingers having a camming edge, and said mounting tube having an external thread; a hose nose sealingly mounted in the nose recess and extending through the interior of the mounting tube with a portion adjacent to the holding fingers for receiving an end of a hose; and a locking sleeve mounted on the mounting tube, said locking sleeve having an internal annular cam for engagement with the camming edge of each of the holding fingers to force each catch into engagement with a hose mounted on the hose nose for holding the hose on the hose nose, and said locking sleeve having an internal thread mateably connected to the external male thread for holding the locking sleeve on to the mounting tube and for moving the locking sleeve axially along the mounting tube.

8. A quick coupling connector for use in connecting and disconnecting hoses adapted for conducting liquids, as defined in claim 5; wherein said female connector body includes a mounting tube connected to the seating tube, said mounting tube having an interior nose recess, said mounting tube including a plurality of integral resilient holding fingers extending away from the guide tube, each of said holding fingers having a resilient cantilever support, a catch formed integral with each support, each catch extending interiorly of the mounting tube, each of said fingers having a camming edge, said mounting tube having an exterior male thread, a valve wall formed integral with the seating tube, a valve tube formed integral with the seating tube on one end and the mounting tube on the other end, said valve wall having a valve seat defining a valve aperture; a hose nose sealingly mounted in the hose recess and extending through the interior of the mounting tube with a portion adjacent to the holding fingers for receiving an end of a hose; a unitary molded plastic valve movably mounted in the valve aperture for controlling flow through the valve aperture, said valve having a valve body, a valve O-ring groove formed in the valve body, a fin formed integral with the valve body and being positioned on the side of the valve body away from the guide tube, and a plurality of legs formed integral with the valve body on the side adjacent to the guide tube, said plurality of legs being positioned in the valve aperture and being engageable with the male connector body to displace the valve body from the valve aperture; a valve O-ring mounted in the vavle O-ring groove for sealing engagement with the valve seat; and a locking sleeve mounted on the mounting tube, said locking sleeve having an internal annular cam for engagement with the camming edge of each of the holding fingers to force each catch into engagement with a hose mounted on the hose nose for holding the hose on the hose nose, and said locking sleeve having an interal female thread mating with the external male thread for holding the locking sleeve on the mounting tube and for moving the mounting sleeve along the mounting tube to force the annular cam into engagement with the camming edge of each of the holding fingers.

9. A quick coupling connector for use in connecting and disconnecting hoses adapted for conducting liquids comprising; a unitary molded plastic male connector body having a flow through passage extending through its length, a guide cylinder forming a portion of the body, a lock recess adjacent to the guide cylinder, a seating cylinder adjacent to one end of the body, and said seating cylinder having an annular seal groove formed therein; an inner body O-ring positioned in the seal groove, a unitary molded plastic female connector body having a flow through passage extending through its length, said female connector body having a guide tube on one end for mateably receiving the guide cylinder, a lock tube connected to the guide tube, said lock tube having a lock finger aperture, a seating tube formed integral with the lock tube for receiving the seating cylinder for selectively sealing engagement with the inner body O-ring, a mounting tube connected to the seating tube, said mounting tube having a nose recess, said mounting tube including a plurality of resilient holding fingers extending away from the guide tube, each of said holding fingers having a resilient cantilever support, a pair of aligned catches formed integral with the free end of each support, each pair of catches extending interiorly of the mounting tube, and each of said fingers having a camming edge; a hose nose sealingly mounted in the nose recess and extending through the interior of the mounting tube with a portion adjacent to the holding fingers for receiving an end of a garden hose, a unitary molded plastic locking sleeve mounted on the mounting tube, said locking sleeve having an internal annular cam for engagement with the camming edge of each of the holding fingers to force each pair of catches into engagement with a hose mounted on the hose nose for holding the hose on the hose nose; and a unitary molded plastic lock ring movably mounted on the female connector body and having a portion releasably engageable with the male connector body through the lock finger aperture for releasably locking the male connector body in the female connector body, wherein said female connector body includes a valve seat adjacent to the seating tube, said valve seat defining a valve aperture; a unitary molded plastic valve movably mounted in the valve aperture, said valve having a valve body on the side of the valve seat spaced away from the guide tube, a valve O-ring groove formed in the valve body, a fin formed integral with the valve body and being positioned on the side of the valve body spaced away from the guide tube, and a plurality of legs formed integral with the valve body on the side of the valve body adjacent to the guide tube, side legs being positioned in the valve aperture and being engageable with the male connector body to displace the valve body from the valve aperture; and a valve O-ring mounted in the valve O-ring groove for sealing engagement with the valve seat.

10. A quick coupling connector for use in connecting and disconnecting hoses adapted for conducting liquids comprising; a unitary molded plastic male connector body having a flow through passage extending through its length, a guide cylinder forming a portion of the body, a lock recess adjacent to the guide cylinder, a seating cylinder adjacent to one end of the body, and said seating cylinder having an annular seal groove formed therein; an inner body O-ring positioned in the seal groove, a unitary molded plastic female connector body having a flow through passage extending through its length, said femal connector body having a guide tube on one end for mateably receiving the guide cylinder, a lock tube connected to the guide tube, said lock tube having a lock finger aperture, a seating tube formed integral with the lock tube for receiving the seating cylinder for selectively sealing engagement with the inner body O-ring, a mounting tube connected to the seating tube, said mounting tube having a nose recess, said mounting tube including a plurality of resilient holding fingers extending away from the guide tube, each of said holding fingers having a resilient cantilever support, a pair of aligned catches formed integral with the free end of each support, each pair of catches extending interiorly of the mounting tube, and each of said fingers having a camming edge; a hose nose sealingly mounted in the nose recess and extending through the interior of the mounting tube with a portion adjacent to the holding fingers for receiving an end of a garden hose, a unitary molded plastic locking sleeve mounted on the mounting tube, said locking sleeve having an internal annular cam for engagement with the camming edge of each of the holding fingers to force each pair of catches into engagement with a hose mounted on the hose nose for holding the hose on the hose nose; and a unitary molded plastic lock ring movably mounted on the female connector body and having a portion releasably engageable with the male connector body through the lock finger aperture for releasably locking the male connector body in the female connector body, wherein said lock ring has an annular lock ring body, said lock ring body having a plurality of finger indentations on its outer surface, a plurality of internal ears formed integral with the interior of the lock ring body engageable with the guide tube for stabilizing the lock ring on the female connector body, a pair of internal guide grooves formed integral with the interior of the lock ring body and being substantially parallel to the longitudinal axis of the lock ring body, and a pair of lock fingers formed integral with the interior of the lock ring body, each of said lock fingers including cantilever resilient arm having one end formed integral with the interior of the lock ring body, and each of said arms extending from the point of connection to the interior of the lock ring body to its free end toward the guide tube, a lock dog formed integral with the free end of each of the resilient arms, and said female connector body having a pair of guide wings formed integrally with opposite sides of the connector body extending radially therefrom aligned with the longitudinal axis of the connector body and being positioned in respective guide grooves, and said lock having a pair of opposed lock finger apertures receiving respective lock fingers.

11. A quick coupling connector for use in connecting and disconnecting hoses adapted for conducting liquids comprising; a unitary molded plastic male connector body having a flow through passage extending through its length, a guide cylinder forming a portion of the body, a lock recess adjacent to the guide cylinder, a seating cylinder adjacent to one end of the body, and said seating cylinder having an annular seal groove formed therein, an inner body O-ring positioned in the seal groove, a unitary molded plastic female connector body having a flow through passage extending through its length, said female connector body having a guide tube on one end for mateably receiving the guide cylinder, a lock tube connected to the guide tube, said lock tube having a lock finger aperture, a seating tube formed integral with the lock tube for receiving the seating cylinder for selectively sealing engagement with the inner body O-ring, a mounting tube connected to the seating tube, said mounting tube having a nose recess, said mounting tube including a plurality of resilient holding fingers extending away from the guide tube, each of said holding fingers having a resilient cantilever support, a pair of aligned catches formed integral with the free end of each support, each pair of catches extending interiorly of the mounting tube, and each of said fingers having a camming edge; a hose nose sealingly mounted in the nose recess and extending through the interior of the mounting tube with a portion adjacent to the holding fingers for receiving an end of a garden hose, a unitary molded plastic locking sleeve mounted on the mounting tube, said locking sleeve having an internal annular cam for engagement with the camming edge of each of the holding fingers to force each pair of catches into engagement with a hose mounted on the hose nose for holding the hose on the hose nose; and a unitary molded plastic lock ring movably mounted on the female connector body and having a portion releasably engageable with the male connector body through the lock finger aperture for releasably locking the male connector body in the female connector body, wherein said male connector body includes a male threaded connector on one end of the male connector body integral with the guide cylinder, a conical lock surface forming a portion of the lock recess, and a guide ring connected to the seating cylinder adjacent to the conical lock surface; said female connector body including a lock flange formed integral with the guide tube, said lock flange having a pair of diametrically opposed finger recesses, said lock tube having a pair of diametrically opposed lock finger apertures extending through the lock tube and being aligned with a respective finger recess, a finger camming recess formed integral with the lock tube and communicating with each lock finger aperture, a valve wall formed integral with the seating tube, said valve wall having a valve seat defining a valve aperture, a valve tube formed integral with the seating tube, a guide flange formed integral with the guide tube, a pair of diametrically opposed guide wings formed integral with the lock tube and extending to the lock flange, said guide wings being substantially parallel to the longitudinal axis of the female connector body, a limit flange formed integral with the mounting tube and formed integral with one end of each of the pair of opposed guide wings, and said mounting tube having an exterior mounting male thread, said locking sleeve having internally threaded female threads mating with the male threads on the mounting tube connecting the locking sleeve to the mounting tube for selectively moving the locking sleeve axially along the mounting tube to urge the holding fingers into engagement with the hose; said lock ring including an annular lock ring body, said lock ring body having a plurality of finger indentations on its outer surface, a plurality of internal ears formed integral with the interior the lock ring body and being engageable with the guide tube for stabilizing the lock ring on the female body, a pair of internal guide grooves slidably receiving the guide wings, said portion of the lock ring releasably engageable with the male connector body being a pair of lock fingers formed integral with the interior of the lock ring body positionable in respective lock ring apertures of the female connector body, each of said lock fingers including a cantilever resilient arm having one end formed integral with the interior of the lock ring body, each of said cantilever resilient arms extending from a point of connection to the exterior of the lock ring body to its free end toward the guide tube, a lock dog formed integral with the free end of each of the resilient arms, each lock dog having an engaging surface engageable with the conical lock surface, each lock dog having a rest surface positionable in the lock recess, and each lock doge having a stop surface engageable with the lock tube of the female connector body; and a unitary molded plastic valve having a portion mounted in the valve aperture for controlling the flow of liquid through the valve aperture, said valve having a valve body and being positioned on the side of the valve wall away from the guide tube, said valve body having a valve O-ring groove formed in the valve body, a fin formed integral with the valve body and being positioned on the side of the valve body away from the guide tube, a plurality of legs formed integral with the valve body and being positioned in the valve aperture, each of said legs including a cantilever post positionable in the valve aperture, each post having a valve catch on the free end of the post adjacent to the guide tube, each valve catch having a valve camming surface engageable with the valve seat to cam the free end of the post inward to allow the catch to be passed through the valve aperture, said legs being engageable with the male connector body to move the valve axially in the valve aperture to displace the valve body from the valve seat; and a valve O-ring positioned in the valve O-ring groove for sealing engagement with the valve seat.

12. A quick coupling connector for use in connecting and disconnecting hoses adapted for conducting liquids comprising: a unitary molded plastic male connector body having a flow through passage through its length, said male connector body having a guide cylinder forming a portion of the body and a lock recess adjacent to the guide cylinder, and a seating cylinder adjacent to one end of the body with a seal groove formed in the seating cylinder; an inner body O-ring positioned in the seal groove; a unitary molded plastic female connector body having a flow through passage extending through its length, said female body having a guide tube on one end for mateably receiving the guide cylinder of the male connector body, a lock tube connected to the guide tube, said lock tube having a pair of opposed lock finger apertures, and a seating tube formed integral with the lock tube for receiving the seating cylinder of the male connector body and for selective sealing engagement with the inner body O-ring; and a lock ring movably mounted on the female connector body and having a portion releasably engageable with the male connector body for releasably locking the male connector body in engagement with the female connector body, said lock ring being a unitary molded plastic part including a pair of integral lock fingers, each of the lock fingers including a resilient arm having one end extending toward the male connector body when said male connector body is positioned adjacent to the guide tube, and each of the resilient arms having a lock dog formed integral with the free end of the respective resilient arm, each lock dog being positionable in the lock finger aperture of the female connector body for engagement with the male connector body to prevent removal of the male connector body from the female connector body, wherein said female connector body includes a lock flange connected to the guide tube, said lock flange having a pair of finger recesses, a finger camming surface formed integral with the lock tube and communicating with each lock finger aperture, a valve wall formed integral with the seating tube, said wall having a valve seat defining a valve aperture, a valve tube formed integral with the seating tube, a guide flange formed integral with the valve tube, a pair of opposed guide wings formed integral with the lock tube, said guide wings being substantially parallel to the longitudinal axis of the female connector body, a mounting tube formed integral with the valve tube, said mounting tube having a limit flange, said mounting tube having an exterior mounting male thread, said mounting tube having an internal nose recess, and a plurality of holding fingers formed integral with the mounting tube; a valve having a portion mounted in the valve aperture for controlling the flow of liquid through the valve aperture; a locking sleeve having internally threaded female threads mating with the male threads on the mounting tube connecting the locking sleeve to the mounting tube for selectively moving the locking sleeve axially along the mounting tube to urge the holding fingers inward; and said lock ring having a pair of guide grooves slidably receiving the guide wings for restricting the movement of the lock ring to an axial movement substantially parallel to the longitudinal axis of the female connector body.

13. A quick coupling connector for use in connecting and disconnecting hoses adapted for conducting liquids comprising: a unitary molded plastic male connector body having a flow through passage through its length, said male connector body having a guide cylinder forming a portion of the body and a lock recess adjacent to the guide cylinder, and a seating cylinder adjacent to one end of the body with a seal groove formed in the seating cylinder; an inner body O-ring positioned in the seal groove; a unitary molded plastic female connector body having a flow through passage extending through its length, said female body having a guide tube on one end for mateably receiving the guide cylinder of the male connector body, a lock tube connected to the guide tube, said lock tube having a pair of opposed lock finger apertures, and a seating tube formed integral with the lock tube for receiving the seating cylinder of the male connector body and for selective sealing engagement with the inner body O-ring; and a lock ring movably mounted on the female connector body and having a portion releasably engageable with the male connector body for releasably locking the male connector body in engagement with the female connector body, said lock ring being a unitary molded plastic part including a pair of integral lock fingers, each of the lock fingers including a resilient arm having one end extending toward the male connector body when said male connector body is positioned adjacent to the guide tube, and each of the resilient arms having a lock dog formed integral with the free end of the respective resilient arm, each lock dog being positionable in the lock finger aperture of the female connector body for engagement with the male connector body to prevent removal of the male connector body from the female connector body, wherein said female connector body includes a valve wall formed integral with the seating tube, said valve wall including a valve seat defining a valve aperture, a mounting tube connected to the seating tube, said mounting tube having a nose recess formed interiorly thereof, said mounting tube having an external male thread formed thereon and including a plurality of resilient holding fingers extending away from the guide tube, each of said holding fingers having a resilient support, a catch formed integral with the free end of each support, each catch extending interiorly of the mounting tube, and each of said fingers having a camming edge; a tubular hose nose sealingly mounted in the nose recess and extending through the interior of the mounting tube with a portion adjacent to the holding fingers for receiving an end of a garden hose; a locking sleeve mounted on the mounting tube, said locking sleeve having an internal annular cam for engagement with the camming edge of each of the holding fingers to force each catch into engagement with a hose mounted on the hose nose for holding the hose on the hose nose, said locking sleeve having an internal female thread mating with the external male thread of the mounting tube for holding the locking sleeve on to the mounting tube and for axial movement of the locking sleeve along with the mounting tube; a valve movably mounted in the valve aperture to control the flow of liquid through the valve aperture, said valve having a valve body, a valve O-ring groove formed in the valve body, a fin formed integral with the valve body and being positioned on the side of the valve body away from the guide tube, and a plurality of legs formed integral with the valve body on the side adjacent to the guide tube, said legs being positioned in the valve aperture and being engageable with the male connector body to displace the valve body from the valve aperture; and a valve O-ring mounted in the valve O-ring groove for sealing engagement with the valve seat.

14. A quick coupling connector for use in connecting and disconnecting hoses adapted for conducting liquids comprising: a unitary molded plastic male connector body having a flow through passage through its length, said male connector body having a guide cylinder forming a portion of the body and a lock recess adjacent to the guide cylinder, and a seating cylinder adjacent to one end of the body with a seal groove formed in the seating cylinder; an inner body O-ring positioned in the seal groove; a unitary molded plastic female connector body having a flow through passage extending through its length, said female body having a guide tube on one end for mateably receiving the guide cylinder of the male connector body, a lock tube connected to the guide tube, said lock tube having a pair of opposed lock finger apertures, and a seating tube formed integral with the lock tube for receiving the seating cylinder of the male connector body and for selective sealing engagement with the inner body O-ring; and a lock ring movably mounted on the female connector body and having a portion releasably engageable with the male connector body for releasably locking the male connector body in engagement with the female connector body, said lock ring being a unitary molded plastic part including a pair of integral lock fingers, each of the lock fingers including a resilient arm having one end extending toward the male connector body when said male connector body is positioned adjacent to the guide tube, and each of the resilient arms having a lock dog formed integral with the free end of the respective resilient arm, each lock dog being positionable in the lock finger aperture of the female connector body for engagement with the male connector body to prevent removal of the male connector body from the female connector body, wherein said male connector body includes a male threaded connector on one end of the body connected to the guide cylinder, a conical lock surface forming a portion of the lock recess, and a guide ring connected to the seating cylinder, said female connector body including a lock flange connected to the guide tube, said lock flange having a pair of finger recesses, a finger camming surface formed integral with the lock tube and connected to each lock finger aperture, a valve wall formed integral with the sealing tube, said valve wall having a valve seat defining a valve aperture, a valve tube formed integral with the seating tube, a guide flange formed integral with the valve tube, a pair of opposed guide wings formed integral with the lock tube, said guide wings being substantially parallel to the longitudinal axis of the female body, a mounting tube formed integral with the valve tube, said mounting tube having a limit flange, said mounting tube having an exterior mounting male thread, said mounting tube having an internal nose recess, and a plurality of holding fingers formed integral with the mounting tube, a tubular hose nose sealingly mounted in the internal nose recess; a valve having a portion mounted in the valve aperture for controlling the flow of liquid through the valve aperture; a locking sleeve having an internally threaded female thread mating with the male thread of the mounting tube connecting the locking sleeve to the mounting tube and moving the mounting sleeve axially along the mounting tube to urge the fingers inward; and said lock ring having a pair of guide grooves slidably receiving the guide wings for restricting the movement of the lock ring to an axial movement substantially parallel to the longitudinal axis of the female connector body.

* * * * *

UNITED STATES PATENT AND TRADEMARK OFFICE
CERTIFICATE OF CORRECTION

PATENT NO. : 4,660,803

DATED : April 28, 1987

INVENTOR(S) : Damon A. Johnston et al.

It is certified that error appears in the above-identified patent and that said Letters Patent is hereby corrected as shown below:

Face of Patent, References, change "Brusculin" to --Brusadin--.

Column 1, line 9, change "Typcially" to --Typically--.

Column 3, line 7, change "cross sectional" to --cross-sectional--.

Column 3, line 12, change "cross sectional" to --cross-sectional--.

Column 3, line 18, change "cross sectional" to --cross-sectional--.

Column 3, line 21, change "cross sectional" to --cross-sectional--.

Column 3, line 25, change "cross sectional" to --cross-sectional--.

Column 3, line 30, change "cross sectional" to --cross-sectional--.

Column 3, line 30, change "Line" to --line--.

Column 3, line 32, change "cross sectional" to --cross-sectional--.

UNITED STATES PATENT AND TRADEMARK OFFICE
CERTIFICATE OF CORRECTION

PATENT NO. : 4,660,803

DATED : April 28, 1987

INVENTOR(S) : Damon A. Johnston et al.

It is certified that error appears in the above-identified patent and that said Letters Patent is hereby corrected as shown below:

```
Column 6, line 17, after "of" insert --the--.
Column 10, line 39, change "quide" to --guide--.
Column 10, line 39, change "slideably" to --slidably--.
Column 11, line 9, delete "of" (first occurrence).
Column 11, line 24, change "slideably" to --slidably--.
Column 12, line 1, change "holder" to --holding--.
Column 12, line 50, change "vavle" to --valve--.
Column 12, line 57, change "interal" to --internal--.
 Column 13, line 62, change "femal" to --female--.
Column 15, line 51, after "interior" insert --of--.
Column 15, line 68, change "doge" to --dog--.
```

Signed and Sealed this

Eighth Day of September, 1987

*Attest:*

DONALD J. QUIGG

*Attesting Officer*   *Commissioner of Patents and Trademarks*